United States Patent
Joshi et al.

(10) Patent No.: US 12,542,671 B2
(45) Date of Patent: Feb. 3, 2026

(54) DETERMINISTIC CRYPTO-RANDOM VALUES FOR CRYPTOGRAPHIC OPERATIONS

(71) Applicant: Capital One Services, LLC, McLean, VA (US)

(72) Inventors: Rohit Joshi, Glen Allen, VA (US); Kevin Boutarel, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 103 days.

(21) Appl. No.: 18/646,242

(22) Filed: Apr. 25, 2024

(65) Prior Publication Data

US 2025/0337576 A1 Oct. 30, 2025

(51) Int. Cl.
*H04L 9/32* (2006.01)
*H04L 9/08* (2006.01)

(52) U.S. Cl.
CPC .......... *H04L 9/3213* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 9,081,978 B1 | 7/2015 | Connolly et al. | |
| 9,785,797 B2 | 10/2017 | Rozenberg et al. | |
| 10,089,493 B2 | 10/2018 | Rozenberg et al. | |
| 10,623,181 B2 | 4/2020 | Iyer et al. | |
| 11,349,661 B2 | 5/2022 | Williamson et al. | |
| 11,520,952 B2 | 12/2022 | Lawrence et al. | |
| 12,204,629 B2 * | 1/2025 | Jaiman | G06F 21/36 |
| 12,380,245 B1 | 8/2025 | Buckingham et al. | |
| 2014/0177825 A1 | 6/2014 | Mattsson et al. | |
| 2017/0344756 A1 | 11/2017 | Mattsson et al. | |
| 2019/0207754 A1 | 7/2019 | Iyer et al. | |
| 2019/0342088 A1 | 11/2019 | Eidson et al. | |
| 2020/0034832 A1 | 1/2020 | Korpal et al. | |

(Continued)

OTHER PUBLICATIONS

Rajaa, Ramita, "Strike a Balance Between Privacy and Personalization with PII Tokenized Sending," MoEngage Blog, Jul. 26, 2023, 5 pages.

(Continued)

*Primary Examiner* — Bassam A Noaman
(74) *Attorney, Agent, or Firm* — Banner & Witcoff, Ltd.

(57) ABSTRACT

Systems, methods, and apparatuses are described for generating deterministic crypto-random values for cryptographic operations such as tokenization. A computing device may receive a plurality of unique character strings by receiving such strings from a server and/or by generating such strings based on a seed value. The computing device may define a seed table comprising a plurality of rows and a plurality of columns such that each row of the plurality of rows corresponds to a different character of the set of characters and each column of the plurality of columns corresponds to a different character of a unique character string, of the plurality of unique character strings, corresponding to the different character. The table may be expanded by processing sequential rows of the seed table to generate a tokenization table. That tokenization table may be used to generate tokenized versions of input data.

20 Claims, 6 Drawing Sheets

(56) References Cited

U.S. PATENT DOCUMENTS

| | | | | |
|---|---|---|---|---|
| 2020/0183823 | A1* | 6/2020 | Arvind | G06F 12/0802 |
| 2020/0374120 | A1 | 11/2020 | Stanley et al. | |
| 2023/0019728 | A1* | 1/2023 | Grover | H04L 9/0866 |
| 2023/0342481 | A1 | 10/2023 | Nikoghossian et al. | |
| 2024/0256513 | A1* | 8/2024 | Reichinger | G06F 16/2453 |
| 2025/0252205 | A1* | 8/2025 | Cheng | G06F 21/6254 |

OTHER PUBLICATIONS

Apr. 19, 2023, How Data Tokenization Plays an Effective Role in Data Security, PROTECTO, 7 pages.

Tokenization vs. Encryption, Skyhigh Security, first date of publication unknown but, prior to Feb. 1, 2024, 6 pages.

Tokenized Settings, salesforce, date of publication unknown but, prior to Feb. 1, 2024, 4 pages.

Types of Tokenization: Vault and Vaultless, Encryption Consulting, date of publication unknown but, prior to Feb. 1, 2024, 6 pages.

Vaultless Tokenization vs. Vault Tokenization, <<https://www.solulab.com/>>, first date of publication unknown but, prior to Feb. 1, 2024, 25 pages.

Protegrity Vaultless Tokenization, FAQs, protegrity, first date of publication unknown but, prior to Feb. 1, 2024, 5 pages.

"Vaultless" or "Reversible" Tokenization—Is it really just encryption with a fancy marketing name?, Information Security, Jun. 8, 2018, 4 pages.

Jul. 14, 2025—(WO) International Search Report and Written Opinion—App No. PCT/US2025/025191.

Jul. 1, 2025—(WO) International Search Report and Written Opinion—App No. PCT/US2025/025691.

* cited by examiner

| | 0 | 1 | 2 | 3 | 4 | 5 | 6 | 7 | 8 | 9 |
|---|---|---|---|---|---|---|---|---|---|---|
| 0 | 7 | 5 | 1 | 2 | 9 | 4 | 8 | 0 | 3 | 6 |
| 1 | 8 | 0 | 5 | 7 | 6 | 2 | 9 | 4 | 1 | 3 |
| 2 | 5 | 2 | 4 | 6 | 3 | 8 | 0 | 1 | 7 | 9 |
| 3 | 7 | 2 | 4 | 7 | 9 | 7 | 9 | 1 | 2 | 1 |
| 4 | 5 | 5 | 2 | 7 | 2 | 4 | 9 | 9 | 0 | 0 |
| 5 | 1 | 2 | 5 | 6 | 8 | 3 | 3 | 1 | 2 | 9 |
| 6 | 0 | 2 | 8 | 9 | 3 | 6 | 7 | 1 | 9 | 9 |
| 7 | 4 | 1 | 2 | 7 | 4 | 9 | 1 | 7 | 2 | 4 |
| 8 | 0 | 6 | 6 | 1 | 5 | 5 | 9 | 2 | 1 | 4 |
| 9 | 4 | 1 | 7 | 9 | 6 | 5 | 2 | 7 | 9 | 1 |

500 — SEED TABLE

FIG. 5B

ROW 0 VALUE:
7512948036
(502a)

SHUFFLED ROW 0 VALUE:
3210987654
(502b)

ROW 1 VALUES AT INDICES INDICATED BY SHUFFLED ROW 0 VALUE:
7508314926
(502c)

| | 0 | 1 | 2 | 3 | 4 | 5 | 6 | 7 | 8 | 9 |
|---|---|---|---|---|---|---|---|---|---|---|
| 0 | 7 | 5 | 1 | 2 | 9 | 4 | 8 | 0 | 3 | 6 |
| 1 | 8 | 0 | 5 | 7 | 6 | 2 | 9 | 4 | 1 | 3 |
| 2 | 5 | 2 | 4 | 6 | 3 | 8 | 0 | 1 | 7 | 9 |
| 3 | 7 | 2 | 4 | 7 | 9 | 7 | 9 | 1 | 2 | 1 |
| 4 | 5 | 5 | 2 | 7 | 2 | 4 | 9 | 9 | 0 | 0 |
| 5 | 1 | 2 | 5 | 6 | 8 | 3 | 3 | 1 | 2 | 9 |
| 6 | 0 | 2 | 8 | 9 | 3 | 6 | 7 | 1 | 9 | 9 |
| 7 | 4 | 1 | 2 | 7 | 4 | 9 | 1 | 7 | 2 | 4 |
| 8 | 0 | 6 | 6 | 1 | 5 | 5 | 9 | 2 | 1 | 4 |
| 9 | 4 | 1 | 7 | 9 | 6 | 5 | 2 | 7 | 9 | 1 |
| 10 | 7 | 5 | 0 | 8 | 3 | 1 | 4 | 9 | 2 | 6 |

501 — EXPANDED SEED TABLE (1 NEW ROW)

```
For i =0; i <= table.length; i++ {
   let entry = table[i]; //e.g., 7512948036
   let shuffle_entry =
   DeterministricCryptoAlgo.shuffle(entry); // initialized using
   Key, Salt
   //e.g., shuffled value = 3210987654
   /Now use this shuffle value to
   for j = 1; j <= table.length; j++ {
      let next_entry = table[j]; //e.g., next entry is 8057629413
      for digit in shuffle_entry { //e.g., 3210987654
         output_entry += next_entry[digit];
         //e.g., output value: 7508314926
      }
      ShuffleTable.Insert(output_entry);
   }
}
```

FIG. 5C

DETERMINISTIC CRYPTO-RANDOM VALUES FOR CRYPTOGRAPHIC OPERATIONS

FIELD OF USE

Aspects of the disclosure relate generally to data tokenization. More particularly, aspects described herein describe a unique process for securely tokenizing data.

BACKGROUND

Organizations often need to store private data (e.g., credit card numbers, social security numbers) in compliance with various standards, such as the Payment Card Industry Data Security Standard (PCI DSS). One approach to securely storing such private data in compliance with PCI DSS is tokenization. Tokenization replaces any data, including sensitive data, with a token. Tokenization can be reversible (meaning that reversible tokens are mapped to data in a way such that the reversible tokens can be processed using a detokenization algorithm to return the original data) or irreversible (meaning that it is impossible for any party to recreate the original value from an irreversible token). The approach taken to generate such tokens is quite different: while a reversible token might be generated using an algorithm with various steps (e.g., replacing characters with other characters based on some set of rules) that can be reversed (e.g., performing those steps in reverse), irreversible tokens are often generated using one-way algorithms.

One approach to reversible tokenization involves using tokenization tables to determine how to replace characters with other characters. An example of a patent that describes table-based vaultless tokenization is currently-pending U.S. patent application Ser. No. 17/901,575. In short, a large number of numeric, alphanumeric, and/or alphabetic tables may be generated to shuffle input values (e.g., "0" becomes "7," "a" becomes "u," and so forth, albeit usually in a much more complicated manner). Such tables are generally generated once and shared across multiple computing devices such that tokenization works consistently and deterministically. With that said, managing and provisioning such tables to various computing devices can be difficult. On one hand, the table itself must be secure, and no human should have access to raw values of the table, as otherwise tokenized values could be reverse engineered by malicious parties. To that end, securing tokenization tables often requires encrypting a tokenization table and storing the table as files, and such files must be themselves securely stored. On the other hand, applications can struggle to manage tokenization tables: because encrypted tokenization tables can be large (often multiple gigabytes) encrypted files, when an application starts, it must often spend multiple minutes to decrypt encrypted tables, store them in memory, and otherwise process those tables. This issue becomes particularly complex when a wide variety of computing devices are tasked with performing consistent tokenization.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to determining deterministic crypto-random values for cryptographic operations such as tokenization. As will be described further below, this process may involve a seed table, such as a short and fairly straightforward table, which may be expanded into a larger tokenization table. While the seed table itself might be small (e.g., a row and column for each digit from 0 to 9; that is, a 100-entry table), the tokenization table might be expanded into a much larger set of data (e.g., thousands, millions, and/or billions of entries) for tokenization. Moreover, while the seed table might be received from an external source or generated based on variables received by an external source, the tokenization table itself might be generated locally and by a computing device that performs the tokenization. This process has significant speed benefits: as will be described below, the processes described herein can allow computing devices to deploy tokenization tables from seed tables in mere seconds (in testing, from 8 minutes to 8 seconds-a sixty-times improvement), which is significantly faster than the process of centrally generating a full tokenization table and receiving it over a network.

More particularly, a computing device may receive a plurality of unique character strings. This may include receiving, for each character of a set of n characters, a corresponding unique character string that comprises a unique and different permutation of the set of n characters of unique character strings that each comprise a different permutation of the set of characters. That set of characters may comprise numeric characters, alphabetic characters, ASCII, unicode, symbols, combination of various character sets, or the like. The computing device may then define a seed table comprising a plurality of rows and a plurality of columns. In that table, each row of the plurality of rows corresponds to a different character of the set of characters, each column of the plurality of columns corresponds to a different position within a given unique character string; and each cell comprises the value of the unique character string corresponding to the particular character corresponding to a row at the particular position corresponding to a column. The computing device may then generate a tokenization table by expanding the seed table by, for each row of the plurality of rows of the seed table, performing a series of steps. Those steps may include retrieving a given row of the seed table, generating a shuffle value by determining a deterministically shuffled order of each value of a plurality of cells of the given row, identifying a different row (e.g., a next row that immediately follows the row), determining an output string by, for each individual value of the shuffle value, retrieving a value of the different row at a column index corresponding to the individual value and adding, to the output string, the value, and adding, to the seed table and based on the output string, a new row. The computing device may then receive tokenization input and output, based on the tokenization table, a tokenized version of the tokenization input. The tokenized version of the tokenization output might be output based on a determination that the tokenization input comprises sensitive data.

The tokenization table might be stored in memory and might be deleted and re-generated as desired. For example, the computing device may store the plurality of unique character strings, delete the tokenization table, and, in response to receiving second tokenization input, re-generate the tokenization table.

The plurality of unique character strings may be received from an external source. For example, as part of receiving the plurality of unique character strings, the computing device may receive, from a server, a predetermined table that defines, for each of the set of characters, a corresponding character string. In that circumstance, the predetermined table may have been generated by generating, for each of the set of characters, a plurality of non-deterministic random values.

The plurality of unique character strings may be generated by the computing device. Such a generation process may involve receipt of a seed value (e.g., a seed string) from a server. These seed values may be generated using random number generating algorithms such as Quantum Random (QRNG), Crypto Random (HRNG, CSPRNG, TRNG, PRNG), or the like. For example, the computing device may receive information indicating a format-preserving encryption key, a format-preserving encryption tweak value, and a seed value. The computing device may then generate a seed hash by hashing the seed value and the format-preserving encryption tweak value. The computing device may then generate a first shuffled string comprising a set of characters by providing, to a random number generator, the seed hash. Then, the computing device may derive a format-preserving encryption key by providing, to a key derivation function, the format-preserving encryption key and the seed value and generate, based on the format-preserving encryption key and the format-preserving encryption tweak value, a format-preserving encryption object. The computing device may then generate a new tweak value by generating, based on a character set of the set of characters and the format-preserving encryption tweak value, a random string generated using, for example, a hardware security module and/or a quantum random number generator. The computing device may then generate the plurality of unique character strings by generating, for each of the set of characters, a unique string corresponding to a given character by processing the first shuffled string and the new tweak value using the format-preserving encryption object. As part of that process, the computing device may modify each of the plurality of unique character strings based on the new tweak value.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, organizations may tokenize data using to protect such data. This process might involve use of a tokenization table which defines how to translate input data (e.g., the data to be protected) into tokenized output data (e.g., some scrambled form of the data to be protected). Such tables are often quite large (e.g., multiple gigabytes), encrypted, and the process of using them is quite complex, which can pose an issue for organizations which seek to enable a wide variety of computing devices to perform tokenization processes. For example, a relatively simplistic computing device might have a difficult time receiving, storing (e.g., in random-access memory), decrypting, and using a large tokenization table in an efficient manner. Moreover, the need to keep tokenization tables secret from users and uniform across a wide variety of computing devices introduces a variety of security issues: for example, transmitting a tokenization table from a central server to a local device can be risky because it exposes it to possible acquisition by a malicious party.

To remedy these and other issues, aspects described herein involve local generation of a tokenization table in a manner that allows a wide variety of computing devices to generate the same tokenization table based on a smaller, more easily-managed seed value and/or seed table. Particularly, a relatively simpler seed table might have been provided from a central server and/or might itself have been generated by a local device based on some seed string or value received from the central server. In this manner, computing devices are enabled to generate, in their own memory, a ready-to-use tokenization table based on relatively simple input data without needing to receive the entirety of that tokenization table over a network.

One benefit of the present disclosure is that the tokenization table is deterministic based on a seed value or seed table, such that the same tokenization table may be generated at different times, on different computing devices, and for different tokenization tasks. For instance, based on a seed value (e.g., 256 bits) and/or a seed table (e.g., 100 entries of a table for values corresponding to the digits 0-9), a computing device might be enabled to generate a million-entry tokenization table that might be identical to other generated tokenization tables generated by other computing devices based on the same seed value and/or seed table. These generated tokenization tables may be similar to random generator values in terms of randomness and character frequency distribution. This allows those different computing devices to tokenize (and de-tokenize) in the same way, standardizing the process.

To provide a simple example of the tokenization table generation process described herein, assume that a company's computer wishes to tokenize some unique data, such as the credit card number of a customer. It may be desirable to reversibly tokenize this credit card number such that the credit card number is obfuscated during any storage/transmission but can be retrieved and detokenized if necessary. To perform a tokenization process of that credit card data, the computing device might first receive a plurality of character strings for each of a set of characters. For example, in the simple context of a string of numbers, the computing device might receive, for each of the digits from 0 to 9, a string of ten unique digits. For instance, "0" might correspond to "7512948036," "1" might correspond to "8057629413," and so on. These strings might be used to define a seed table, where each row is a character ("0," "1," and so forth), and each column is a character of the corresponding unique string of numbers (for the row "0," a first column with a value of "7," a second column with a value of "5," and so forth). The result would, in this example, be a table with ten rows, ten columns, and one hundred entries. A tokenization table might then be generated by expanding this seed table in an algorithmic way. For example, a row (e.g., the row for "0") might be retrieved, shuffled using a predetermined deterministic algorithm, and then values of the next row might be retrieved in an order based on the values of the shuffled row. These deterministically-retrieved values might then be inserted as an entirely new row to the seed table. In this manner, through a deterministic process that can be repeated on a variety of different computing devices, new rows are added to the seed table based on existing values of the seed table. This process can expand the seed table to any size desired, including to sizes of thousands, millions, or even billions of rows, all in a manner which can be replicated on different computing devices to reliably produce the same tokenization table. In turn, this tokenization table might be used for tokenization of received input on various computing devices.

In the example provided above, while the seed table itself might have been only a kilobyte of data such that the seed table could have been transmitted in a relatively inconsequential amount of time, the tokenization table generated based on that seed table might be multiple gigabytes and thus might have taken significantly longer to transmit. Indeed, real-world testing of the aforementioned tokenization table process reveals significant speed benefits: the process of generating one million entries using just ten seed table entries took approximately 442 milliseconds for numeric entries, 1.75 seconds for alphanumeric entries, 1.52 seconds for alphabetic entries, and 1.88 seconds for all three tables in parallel. The process is slightly slower (but not by much) for a seed table of 100 entries: it took approximately 707 milliseconds for numeric entries, 2.1 seconds for alphanumeric entries, 2.1 seconds for alphabetic entries, and 2.3 seconds for all three tables in parallel. In fact, generating larger tables (a 3-million-entry numeric table, a 4-million-entry alphanumeric table, and a 1-million-entry alphabetic table) exhibited similar speed: it took approximately 7.6 seconds to generate such tables. In comparison, transmission of similar tokenization tables over an internal network could take significantly longer (tens of seconds, if not minutes, if not hours under particularly adverse conditions).

Particularly in view of the above, aspects described herein improve the functioning of computers by improving the process by which computing devices process (and, in particular, tokenize) data as well as the security of data involved in such tokenization processes. Tokenization is a computationally complex computer-implemented data processing method that, while deterministic, is generally (and intentionally) designed to not be reasonably performable by human beings. With that said, the process of ensuring that multiple computing devices perform tokenization in the same way (e.g., in a reversible, deterministic, and generally consistent manner) is difficult, particularly given that tokenization processes must be secret, secure, and the fact that data used in tokenization (e.g., tokenization tables) can be large and cumbersome. Aspects described herein remedy these and other issues by devising a deterministic and easily-deployed manner for virtually any computing device to acquire a tokenization table of a desired size without requiring that the tokenization table be itself transmitted over a network. This process, as indicated by the testing results above, is significantly faster than transmitting any tokenization table over a network. Moreover, this approach improves security significantly, as it lessens the risk of such a tokenization table itself being acquired by malicious parties.

Before discussing these concepts in greater detail, however, several examples of a computing device that may be used in implementing and/or otherwise providing various aspects of the disclosure will first be discussed with respect to FIG. 1.

Figure 1:
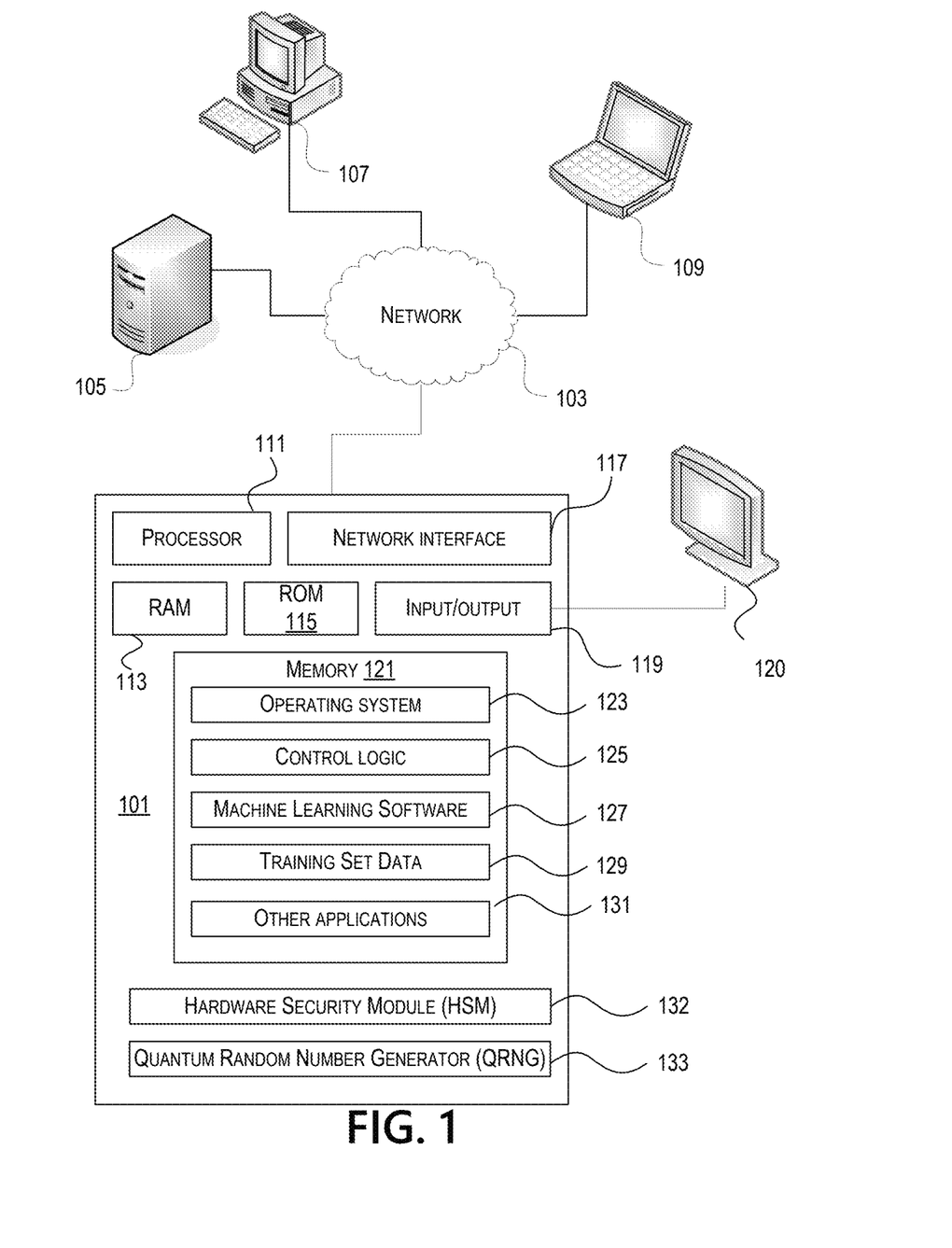
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

FIG. 1 also shows that the computing device 101 may comprise a Hardware Security Module (HSM) 132 and/or a Quantum Random Number Generator (QRNG) 133. The HSM 132 may comprise any computing module (e.g., one or more computer chips, attached cards, or the like) which may be capable of managing secrets, performing encryption and/or decryption, and/or otherwise performing security- and/or authentication-related functions. The HSM 132 may comprise, for instance, one or more secure cryptoprocessor chips which are capable of performing cryptographic operations. The QRNG 133 may comprise any computing module (e.g., one or more computer chips, attached cards, or the like) capable of generating a random number. Such a random number might be generated using quantum methods which permit the random number to have a high degree of entropy.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
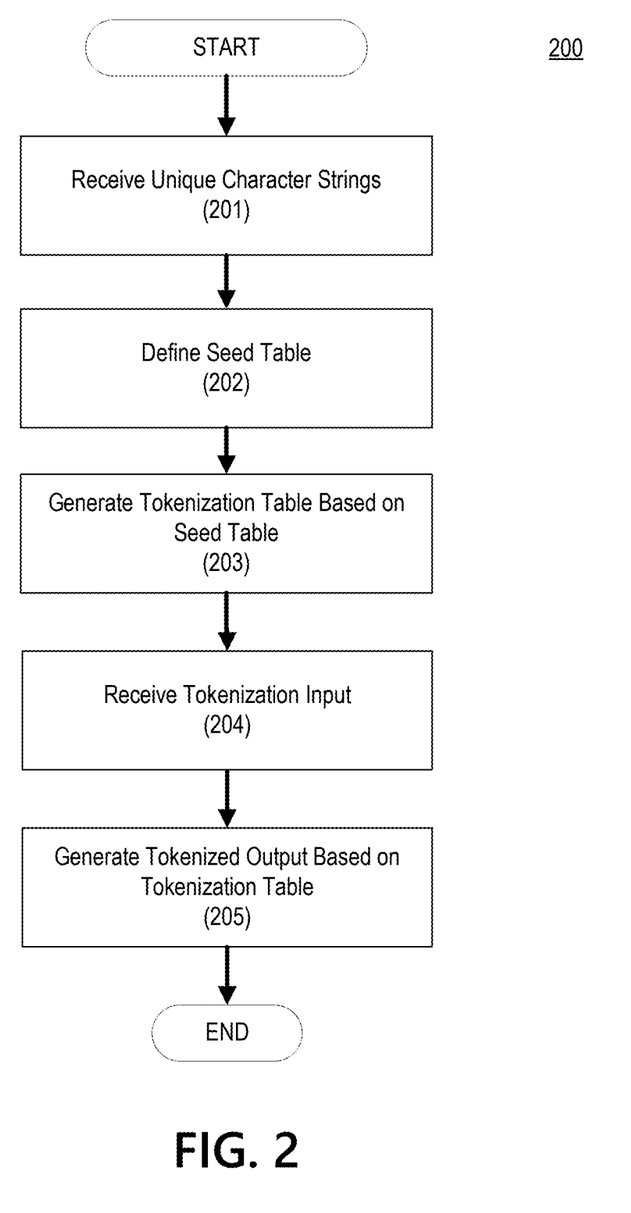
FIG. 2 depicts steps of a method for generating a tokenization table and using it to generate tokenized output.

FIG. 2 depicts a method 200 comprising steps for generating deterministic crypto-random values for cryptographic operations such as tokenization. The method 200 may be performed by a computing device, such as any one of the devices described with respect to FIG. 1. The steps shown in FIG. 2 are illustrative, and may be re-arranged, omitted, and/or modified as desired. A computing device may comprise one or more processors and memory storing instructions that, when executed by the one or more processors, cause the performance of one or more of the steps depicted in FIG. 2. One or more non-transitory computer-readable media may store instructions that, when executed, cause the performance of one or more of the steps depicted in FIG. 2.

In step 201, a computing device may receive one or more unique character strings. For example, the computing device may receive a plurality of unique character strings such that each unique character string of the plurality of unique character strings corresponds to a different character of a set of characters. For instance, the computing device may receive a plurality of unique character strings by receiving, for each character of a set of n characters, a corresponding unique character string that comprises a unique and different permutation of the set of n characters. To provide a particular example, the character "3" might correspond to a string of "6842868421," whereas the character "1" might correspond to a string of "9768268211." The string may be a length defined by the number of unique characters in a set of unique characters and may comprise characters from that set of unique characters. For instance, in the example provided above, each string is ten characters long (as there are ten digits from 0 to 9) and comprises only digits.

All or portions of the unique character strings may be randomly generated using, for example, a hardware security module (such as the HSM 132 of FIG. 1) and/or a quantum random number generator (such as the QRNG 133 of FIG. 1). For example, the computing device may use one or more encryption algorithms executable on the HSM 132 to generate one or more unique character strings. This may advantageously ensure that the generation process is secure, as the HSM 132 may be capable of executing more secure algorithms than might be executed on other hardware modules (e.g., a conventional processor). As another example, the computing device may use the QRNG 133 to generate a random seed value which is used as the basis for generating the one or more unique character strings. This may advantageously ensure that the one or more unique character strings are maximally random.

The set of characters referenced herein may involve any form of characters, including but not limited to numeric characters, alphabetic characters, symbols, and the like. One advantage of the present disclosure is that it allows deployment of tokenization tables for a wide variety of different possible inputs: Chinese characters, Cyrillic script, the Latin alphabet, numbers, ASCII symbols, and the like. This is particularly useful where, for example, the nature of the input to be tokenized might be unknown. For example, tokenizing a street address in America generally requires an alphanumeric character set (but might also need symbols as well, to account for dashes, periods, and the like), but tokenizing the same street address in Japan might require a wide variety of character sets (e.g., hiragana, katakana, kanji, the Latin alphabet, numbers, and symbols). As such, while numbers-based examples are often provided herein for the purposes of simplifying the explanation of various processes, the present disclosure is in no way limited to such numbers.

Additionally, aspects described herein may apply to words, phrases, and other combinations of characters. For example, all of the approaches described herein could be applied to whole words (e.g., a dictionary of all English words) in the same process as it involves digits, the alphabet, or the like. While this process might be computationally significantly more involved (as there are thousands of words in common use, as compared to the ten digits used for examples herein), it may be useful where, for example, the tokenization table is ultimately used to tokenize paragraphs of text or the like.

As part of receiving the one or more unique character strings in step 201, the computing device may generate the one or more unique character strings based on a seed value. An illustrative algorithm for such a process is described in detail below with respect to FIG. 4. That said, as a preliminary introduction, the computing device may be configured to receive a seed value (e.g., 256 bits) that is a fixed value shared amongst various devices and might use that seed value to, in a deterministic way, generate unique character strings for each character of a set of characters. This process advantageously means that, rather than sharing a seed table, the only thing shared amongst various computers that can perform tokenization might be a unique string (e.g., only 256 bits) that ultimately can be used to generate multi-million-entry tokenization tables.

Additionally and/or alternatively, the computing device may receive the one or more unique character strings from a third party. In this manner, the computing device might receive information which can be converted into a seed table and thus used to quickly start generation of a tokenization table. For example, the computing device may receive, from a server, a predetermined table that defines, for each of the set of characters, a corresponding character string, wherein the predetermined table was generated by generating, for each of the set of characters, a plurality of non-deterministic random values.

In step 202, the computing device may define a seed table. For example, the computing device may define a seed table comprising a plurality of rows and a plurality of columns defining a plurality of cells. In that case, each row of the plurality of rows corresponds to a different character of the set of characters, each column of the plurality of columns corresponds to a different position within a given unique character string, and each cell comprises the value of the unique character string corresponding to the particular character corresponding to a row at the particular position corresponding to a column. An example of such a seed table is discussed below with respect to FIG. 5A.

In step 203, the computing device may generate a tokenization table based on the seed table. This process may comprise generating new rows for the seed table based on values of the seed table itself. For example, the computing device may generate a tokenization table by expanding the seed table on a row-by-row or similar basis. A detailed analysis for an algorithm for performing this process is discussed below with respect to FIG. 3.

In step 204, the computing device may receive tokenization input. Tokenization input may comprise any content (e.g., a string, a number, a paragraph) that is to be tokenized based on the tokenization table generated in step 203. This input might come from one or more computing devices, from a user interface, or the like. For example, the computing device may receive tokenization input from one or more sources, such as a user interface. The tokenization input might comprise sensitive data, such as personal information of a user (e.g., a credit card number, a social security number, an address, or the like).

In step 205, the computing device may generate tokenized output based on the tokenization table. For example, the computing device may output, based on the tokenization table, a tokenized version of the tokenization input. This might comprise replacing one or more portions of the tokenized input with a value from the tokenization table. For instance, if the tokenization input is "123," then values from the first, second, and third rows and/or columns of the tokenization table might be retrieved and used to generate a new, tokenized string. This output might be conditioned on the nature of the input provided in step 204. For example, the computing device may output the tokenized version of the tokenization input based on a determination that the tokenization input comprises sensitive data.

After use of the tokenization table, the computing device may be configured to delete the tokenization table and re-generate it as needed. This process may advantageously ensure that the tokenization table is not stored when not needed, which can improve security. For example, the computing device may store the plurality of unique character strings but delete the tokenization table and, in response to receiving second tokenization input, re-generate the tokenization table (e.g., by repeating step 203).

Figure 3:
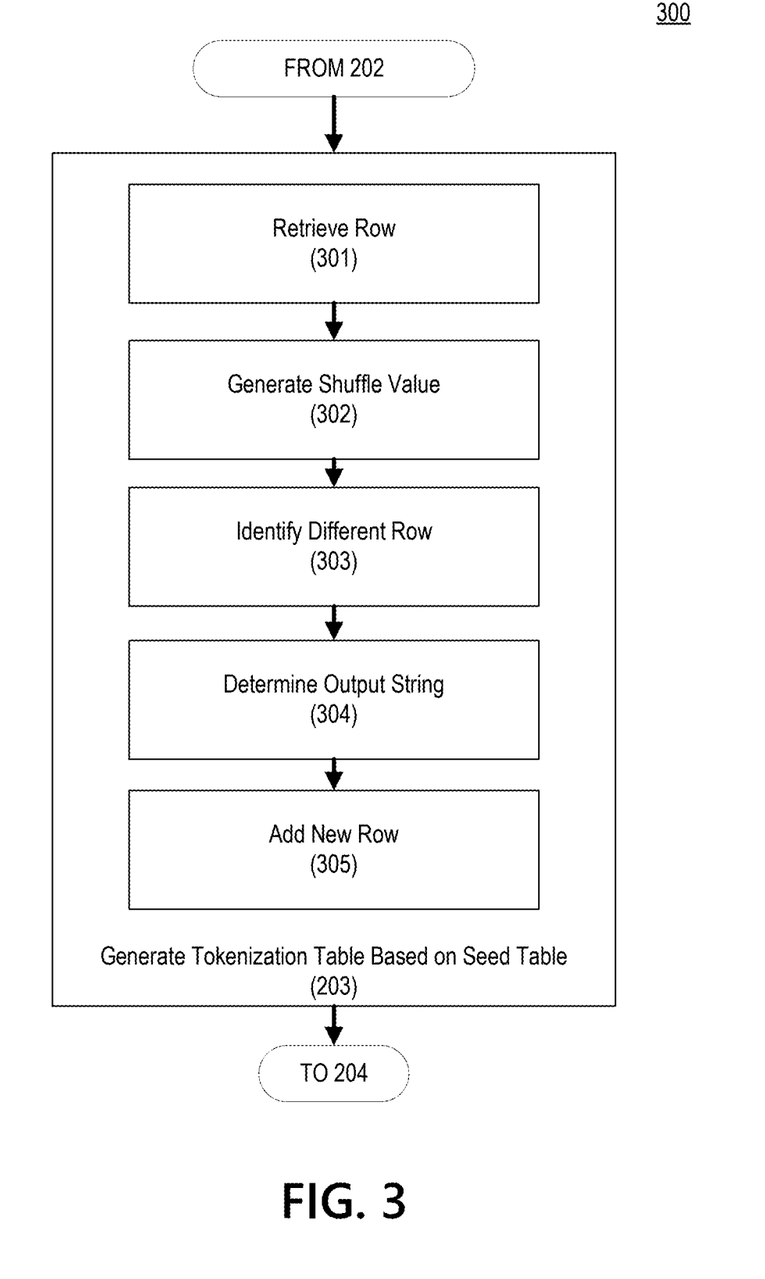
FIG. 3 depicts steps of a method for expanding a seed table to generate a tokenization table.

FIG. 3 depicts steps of a method 300 which may be taken as part of step 203 of FIG. 2; that is, the process by which a tokenization table is generated based on a seed table. A visual representation of this process is later described with respect to FIG. 5A, FIG. 5B, and FIG. 5C. The method 300 may be performed by a computing device, such as any one of the devices described with respect to FIG. 1. The steps shown in FIG. 3 are illustrative, and may be re-arranged, omitted, and/or modified as desired. A computing device may comprise one or more processors and memory storing instructions that, when executed by the one or more processors, cause the performance of one or more of the steps depicted in FIG. 3. One or more non-transitory computer-readable media may store instructions that, when executed, cause the performance of one or more of the steps depicted in FIG. 3.

In step 301, as part of generating the tokenization table based on the seed table (step 203 of FIG. 2), the computing device may retrieve a row. For example, the computing device may retrieve a particular row (e.g., a given row) of the seed table based on some ordering or rule (e.g., retrieve every row in sequence, every other row, a random row). Given that the process depicted in FIG. 3 may be repeated to add multiple rows (as many as desired) to a seed table to generate a tokenization table, step 301 may be performed with respect to every row of a table, a substantial majority of rows, random rows, or the like. Indeed, in many cases (e.g., to generate a multi-million-entry-long tokenization table), the process depicted in FIG. 3 may be repeated often, such that the same or similar rows might be iterated over multiple times. This does not produce the same content despite the repetition because, as will be detailed below, a next row might be retrieved, new rows may be added at any part of the seed table, and the algorithm may be configured to deterministically vary the retrieval of rows and outputting of new rows over time.

In step 302, as part of generating the tokenization table based on the seed table (step 203 of FIG. 2), the computing device may generate a shuffle value. A shuffle value may comprise a deterministically rearranged series of values from the row retrieved in step 301. For example, the computing device may generate a shuffle value by determining a deterministically shuffled order of each value of a plurality of cells of the given row. This process might result in a string. For example, for a row with the columns "7," "5," "1," "2," "9," "4," "8," "0," "3," and "6," the string for the row (that is, "7512948036") might be deterministically shuffled to "3210987654." The algorithm used to shuffle the string might vary based on the number of rows in the table, the number of new rows created, or the like. That way, while the algorithm might be deterministic, it might shuffle the same string differently at different times based on other variables related to the table.

In step 303, as part of generating the tokenization table based on the seed table (step 203 of FIG. 2), the computing device may identify a different row. The different row may comprise any row other than the row selected in step 301, such as a next row. For instance, the different row might be the row immediately following the row selected in step 301, a random row below the row selected in step 301, or the like. For example, the computing device may identify a different row that immediately follows the row.

In step 304, as part of generating the tokenization table based on the seed table (step 203 of FIG. 2), the computing device may determine an output string. This process might involve using the shuffle value to select indexes from the next row selected in step 303. For example, the computing device may determine an output string by retrieving a value of the different row at a column index corresponding to the individual value and adding, to the output string, the value.

To explain the process of step 304 by way of illustration, assume the following illustrative seed table for numbers (which is significantly simplified for the purposes of illustration):

TABLE 1

|   | 0 | 1 | 2 | 3 | 4 | 5 | 6 | 7 | 8 | 9 |
|---|---|---|---|---|---|---|---|---|---|---|
| 0 | 7 | 5 | 1 | 2 | 9 | 4 | 8 | 0 | 3 | 6 |
| 1 | 8 | 0 | 5 | 7 | 6 | 2 | 9 | 4 | 1 | 3 |
| ... |   |   |   |   |   |   |   |   |   |   |
| 9 | 4 | 1 | 7 | 9 | 6 | 5 | 2 | 7 | 9 | 1 |

In this case, assume that, as part of step 301, the first row (row 0) is selected. In that circumstance, row 0 has a string value of "7512948036." Assume further that row 0 was deterministically shifted shuffled to a shuffle value of "3210987654." This shuffle value can then define the ordering of values from the next row (in this example, row 1) to determine a new string. In this example, because the first entry in the shuffle value is "3," then the first entry in the output string would be the value of row 1 at column 3; that is, "7." Similarly, because the second entry in the shuffle value is "2," then the second entry in the output string would be the value of row 1 at column 2; that is, "5." This process continues by concatenating each retrieved value until the output value is determined: "7508314926."

In step 305, as part of generating the tokenization table based on the seed table (step 203 of FIG. 2), the computing device may add a new row. For example, the computing device may add, to the seed table and based on the output string, a new row. This may involve inserting the new row at the end of the seed table or anywhere else in the seed table. Returning to the example provided above, the result of such a process may look like the following:

TABLE 2

|   | 0 | 1 | 2 | 3 | 4 | 5 | 6 | 7 | 8 | 9 |
|---|---|---|---|---|---|---|---|---|---|---|
| 0 | 7 | 5 | 1 | 2 | 9 | 4 | 8 | 0 | 3 | 6 |
| 1 | 8 | 0 | 5 | 7 | 6 | 2 | 9 | 4 | 1 | 3 |
| ... |   |   |   |   |   |   |   |   |   |   |

TABLE 2-continued

|   | 0 | 1 | 2 | 3 | 4 | 5 | 6 | 7 | 8 | 9 |
|---|---|---|---|---|---|---|---|---|---|---|
| 9 | 4 | 1 | 7 | 9 | 6 | 5 | 2 | 7 | 9 | 1 |
| 10 | 7 | 5 | 0 | 8 | 3 | 1 | 4 | 9 | 2 | 6 |

Figure 4:
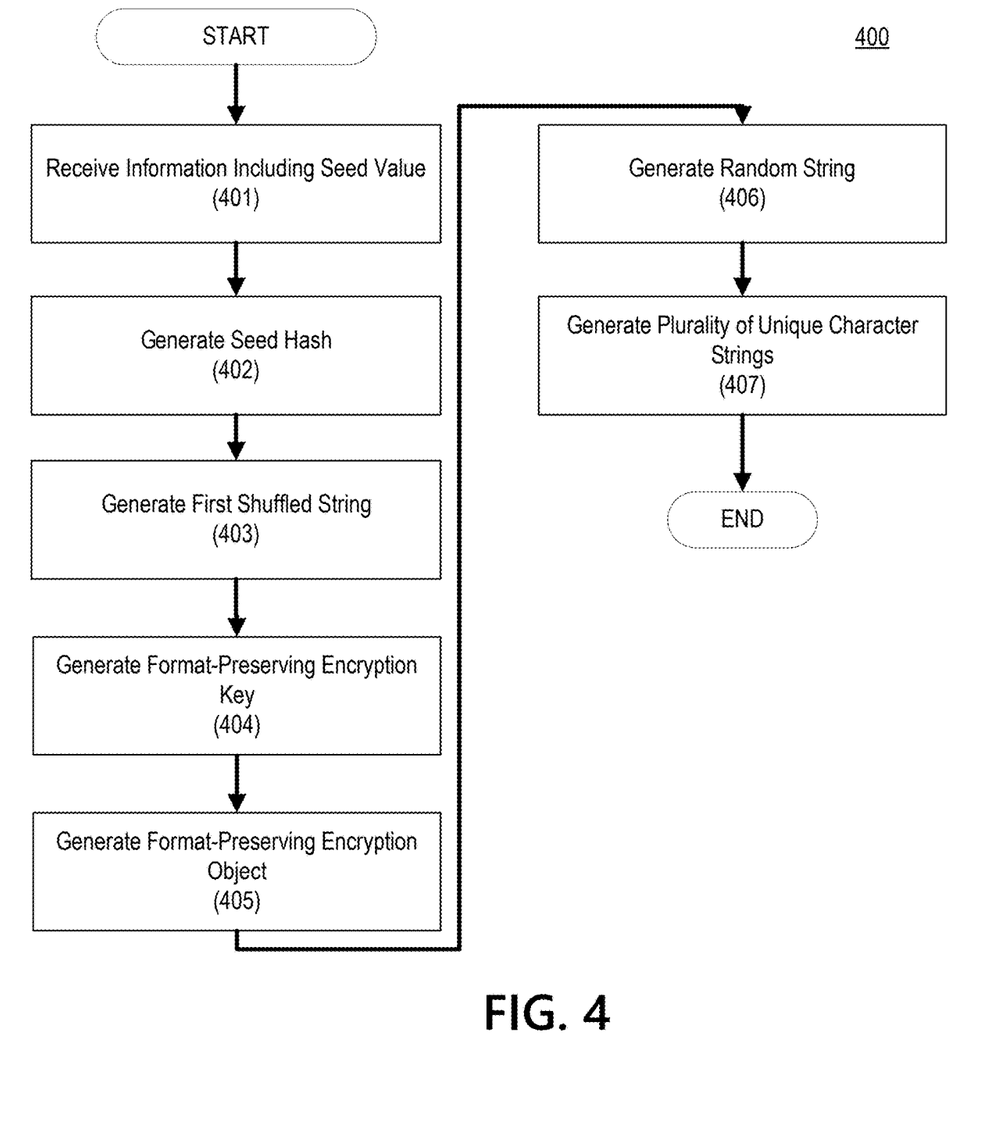
FIG. 4 depicts steps for generating a plurality of unique character strings which might be used as part of generating a tokenization table.

FIG. 4 depicts a method 400 comprising steps for generating a plurality of unique character strings based on a seed value. This process may be part of and/or may precede step 201 of FIG. 2. The method 400 may be performed by a computing device, such as any one of the devices described with respect to FIG. 1. The steps shown in FIG. 4 are illustrative, and may be re-arranged, omitted, and/or modified as desired. A computing device may comprise one or more processors and memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 401, the computing device may receive information including a seed value. The information might comprise a variety of data elements which, as will be detailed below, can be used by the computing device to deterministically generate the plurality of unique character strings. For example, the computing device may receive information indicating one or more of a format-preserving encryption key, a format-preserving encryption tweak value, and/or a seed value. In that example, the format-preserving encryption key might comprise 256 bits, the format-preserving encryption tweak value might comprise any value (e.g., a single integer), and the seed value may comprise a different set of 256 bits.

In step 402, the computing device may generate a seed hash. The computing device may generate a hash of the seed value received in step 401. For example, the computing device may generate a seed hash by hashing the seed value and the format-preserving encryption tweak value. To generate such a hash, an encryption algorithm might be used, such as a Hash-Based Message Authentication Code (HMAC) algorithm (e.g., HMAC_sha512, which can use the seed value and the tweak value referenced above to generate a 64-byte hash). The seed hash might be further processed as desired. For example, where a function is used to generate a 64-byte hash, the 64 bytes might be split into two 32-byte arrays and compared using an XOR operation to generate a new 32-byte string. That new 32-byte string might then be further processed using, for example, the ChaCha algorithm (e.g., using the rand_chacha function and passing the new 32-byte string as input to generate the hash).

In step 403, the computing device may generate a first shuffled string. The first shuffled string may comprise a deterministically permutated stirring based on a fixed value (e.g., "0123456789" for a numeric seed table, shifted left or right as desired) and/or a randomly-determined string. That randomly-determined string might be generated using the seed hash. For example, the computing device may generate a first shuffled string comprising a set of characters by providing, to a random number generator, the seed hash.

In step 404, the computing device may generate a format-preserving encryption key. This may involve providing an HMAC algorithm, such as the function pbkdf2_hmac or a similar key derivation function, with the seed value or similar data received in step 401. For example, the computing device may derive a format-preserving encryption key by providing, to a key derivation function, the format-preserving encryption key and the seed value.

In step 405, the computing device may generate a format-preserving encryption object. The object may be, for example, a software-defined object such as one that may be created using the FFI-256 and/or FF3-256 format-preserving encryption algorithms. The algorithm used may generate the object based on the format-preserving encryption key and/or the format-preserving encryption tweak value. For example, the computing device may generate, based on the format-preserving encryption key and the format-preserving encryption tweak value, a format-preserving encryption object.

In step 406, the computing device may generate a random string. The random string may be generated using the HSM 132 and/or the QRNG 133 of FIG. 1. The random string may be a string based on the character set desired (e.g., numeric, alphanumeric, alphabet). The random string may be generated further based on any information received in step 401, such as the format-preserving encryption tweak value. For example, the computing device may generate a new tweak value by generating, based on a character set of the set of characters and the format-preserving encryption tweak value, a random string.

In step 407, the computing device may generate a plurality of unique character strings. For example, the computing device may generate the plurality of unique character strings by generating, for each of the set of characters, a unique string corresponding to a given character by processing the first shuffled string and the new tweak value using the format-preserving encryption object.

One way to generate the plurality of unique character strings is through use of the format-preserving encryption object referenced with respect to step 405. The computing device may perform an encrypt option using the format-preserving encryption object and with respect to the first shuffled string in step 403 and/or the random string referenced with respect to step 406. This process might be looped until each character (e.g., each digit from 0-9, each alphabetic letter) will have a unique string (that is, no two characters have the same string). This process might be further refined by further shuffling each character, randomly selecting each character, or the like. The computing device may additionally and/or alternatively modify each of the plurality of unique character strings based on the new tweak value. For example, if the new tweak value is an integer (e.g., 3), then one or more of the plurality of unique character strings might be shifted left or right based on that integer.

Figure 5A:
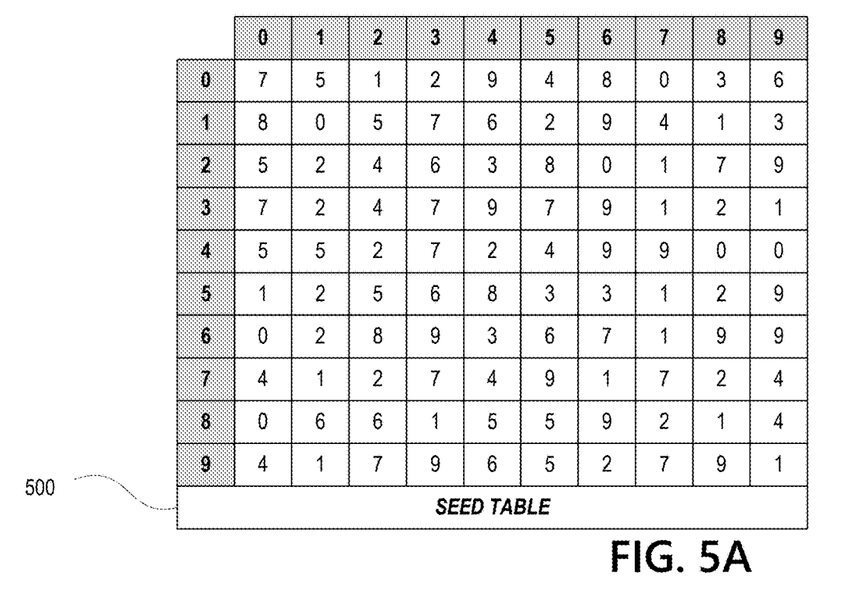
FIG. 5A depicts a seed table.

FIG. 5A depicts a seed table 500 similar to, but in more detail than, Table 1 (above). This example shows a seed table for the digits 0 through 9, showing random entries for each row and column, with no two rows having the same series of columns. For the purposes of illustration, the seed table 500 only comprises digits from 0 to 9; however, any variety of characters (e.g., letters, symbols, Chinese characters) may be used. Moreover, in some circumstances, the row identifiers might be a variety of values, such as whole words, phrases, or the like.

Figure 5B:
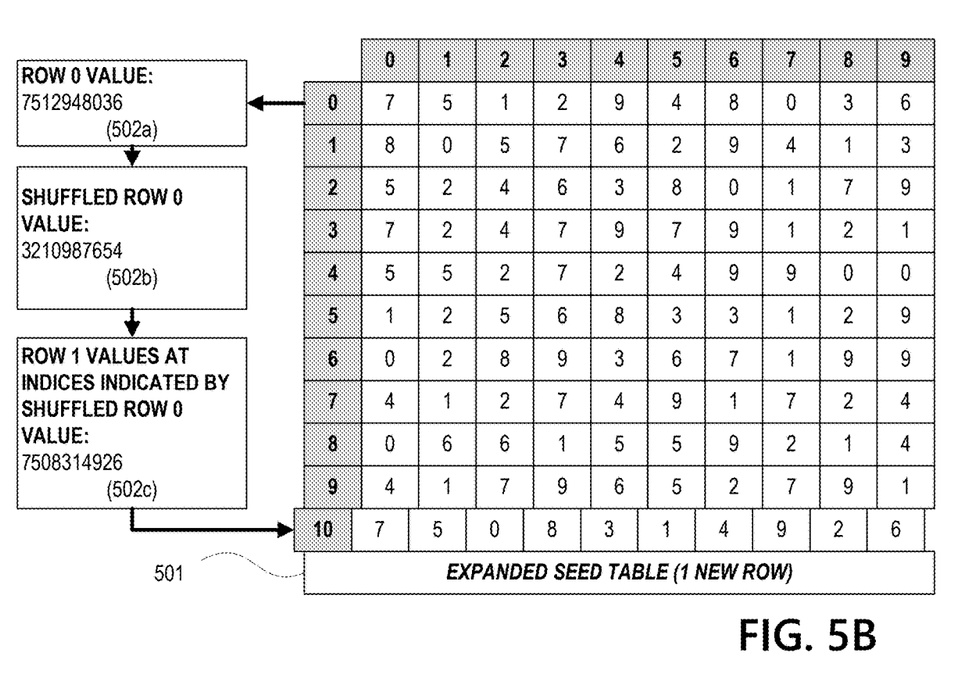
FIG. 5B depicts an expanded seed table.

FIG. 5B depicts an expanded seed table 501, illustrating how the seed table 500 might be processed (based on the process described with respect to FIG. 3) to add a new row. Box 502a indicates the value of row 0; that is, "7512948036." Box 502b indicates how the value of row 0 might be shifted slightly to a new value; that is, "3210987654." Box 502c depicts how the value in box 502b might be used as indices for determining an output string based on the columns of row 1. This process is described in more detail above with respect to FIG. 3.

Figure 5C:
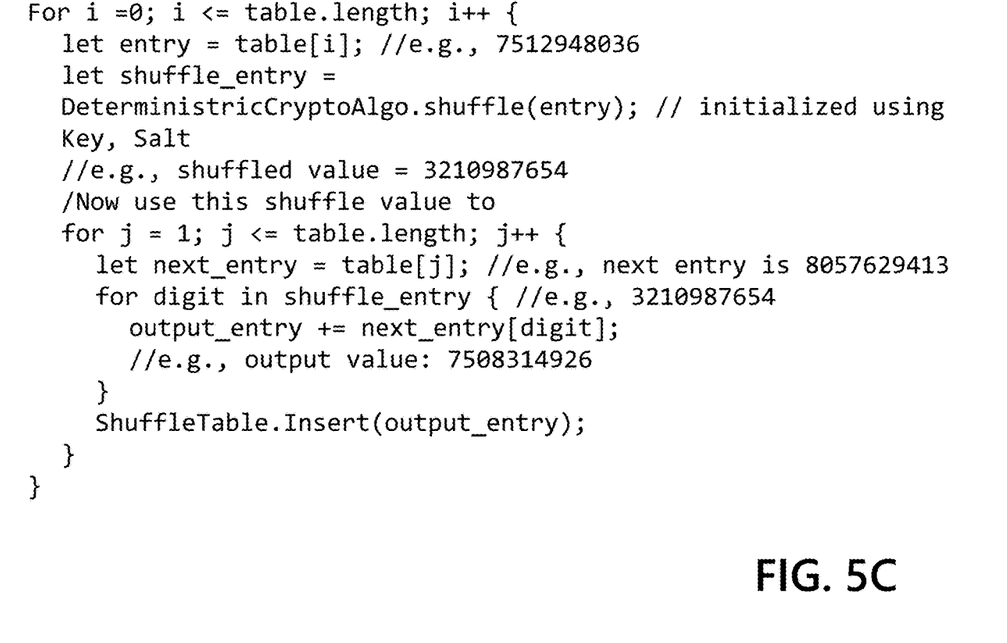
FIG. 5C depicts pseudocode for expanding a seed table.

FIG. 5C illustrates pseudocode illustrating the process depicted in FIG. 3, FIG. 5A, and FIG. 5B. This code shows a circumstance where a row is selected, the immediate next row is also selected, and a shuffled version of the values of the first row is used as indices for determining an output string based on values of the next row.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to generate deterministic crypto-random values for cryptographic operations, the computing device comprising: one or more processors; and memory storing instructions that, when executed by the one or more processors, cause the computing device to:
   receive a plurality of unique character strings by receiving, for each character of a set of n characters, a corresponding unique character string that comprises a unique and different permutation of the set of n characters;
   define, based on the plurality of unique character strings, a seed table comprising a plurality of rows and a plurality of columns defining a plurality of cells, wherein:
      each row of the plurality of rows corresponds to a different character of the set of n characters,
      each column of the plurality of columns corresponds to a different position within a given unique character string, and
      each cell comprises a value of the unique character string corresponding to a particular character corresponding to a row at a particular position corresponding to a column;
   generate a tokenization table by expanding the seed table by, for each row of the plurality of rows of the seed table:
      retrieving a given row of the seed table,
      generating a shuffle value by determining a deterministically shuffled order of each value of a plurality of cells of the given row,
      identifying a different row, and
      determining an output string by, for each individual value of the shuffle value:
         retrieving a value of the different row at a column index corresponding to the individual value,
         adding, to the output string, the value, and
         adding, to the seed table and based on the output string, a new row;
   receive tokenization input; and
   output, based on the tokenization table, a tokenized version of the tokenization input.

2. The computing device of claim 1, wherein the instructions, when executed by the one or more processors, cause the computing device to receive the plurality of unique character strings by causing the computing device to:
   receive information indicating:
   a format-preserving encryption key;
   a format-preserving encryption tweak value; and
   a seed value;
   generate a seed hash by hashing the seed value and the format-preserving encryption tweak value;

generate a first shuffled string comprising a set of n characters by providing, to a random number generator, the seed hash;

derive a format-preserving encryption key by providing, to a key derivation function, the format-preserving encryption key and the seed value;

generate, based on the format-preserving encryption key and the format-preserving encryption tweak value, a format-preserving encryption object;

generate a new tweak value by generating, based on a character set of the set of n characters and the format-preserving encryption tweak value, a random string; and generate the plurality of unique character strings by generating, for each of the set of n characters, a unique string corresponding to a given character by processing the first shuffled string and the new tweak value using the format-preserving encryption object.

3. The computing device of claim 2, wherein the instructions, when executed by the one or more processors, further cause the computing device to:

modify each of the plurality of unique character strings based on the new tweak value.

4. The computing device of claim 1, wherein the instructions, when executed by the one or more processors, cause the computing device to receive the plurality of unique character strings by causing the computing device to:

receive, from a server, a predetermined table that defines, for each of the set of n characters, a corresponding character string, wherein the predetermined table was generated by generating, for each of the set of n characters, a plurality of non-deterministic random values.

5. The computing device of claim 1, wherein the instructions, when executed by the one or more processors, cause the computing device to:

store the plurality of unique character strings;
delete the tokenization table; and
in response to receiving second tokenization input, re-generate the tokenization table.

6. The computing device of claim 1, wherein the instructions, when executed by the one or more processors, cause the computing device to output the tokenized version of the tokenization input based on a determination that the tokenization input comprises sensitive data.

7. The computing device of claim 1, wherein the set of n characters comprises one or more of: numeric characters; alphabetic characters; or symbols.

8. The computing device of claim 1, wherein the different row immediately follows the given row.

9. A method for generating deterministic crypto-random values for cryptographic operations, the method comprising:

receiving a plurality of unique character strings by receiving, for each character of a set of n characters, a corresponding unique character string that comprises a unique and different permutation of the set of n characters;

defining, based on the plurality of unique character strings, a seed table comprising a plurality of rows and a plurality of columns defining a plurality of cells, wherein:

each row of the plurality of rows corresponds to a different character of the set of n characters, each column of the plurality of columns corresponds to a different position within a given unique character string, and each cell comprises a value of the unique character string corresponding to a particular character corresponding to a row at a particular position corresponding to a column;

generating a tokenization table by expanding the seed table by, for each row of the plurality of rows of the seed table:

retrieving a given row of the seed table, generating a shuffle value by determining a deterministically shuffled order of each value of a plurality of cells of the given row, identifying a different row, determining an output string by, for each individual value of the shuffle value:

retrieving a value of the different row at a column index corresponding to the individual value, adding, to the output string, the value, and adding, to the seed table and based on the output string, a new row;

receiving tokenization input; and outputting, based on the tokenization table, a tokenized version of the tokenization input.

10. The method of claim 9, wherein the receiving the plurality of unique character strings comprises:

receiving information indicating:

a format-preserving encryption key;

a format-preserving encryption tweak value; and a seed value;

generating a seed hash by hashing the seed value and the format-preserving encryption tweak value;

generating a first shuffled string comprising a set of characters by providing, to a random number generator, the seed hash;

deriving a format-preserving encryption key by providing, to a key derivation function, the format-preserving encryption key and the seed value;

generating, based on the format-preserving encryption key and the format-preserving encryption tweak value, a format-preserving encryption object;

generating a new tweak value by generating, based on a character set of the set of n characters and the format-preserving encryption tweak value, a random string; and generating the plurality of unique character strings by generating, for each of the set of n characters, a unique string corresponding to a given character by processing the first shuffled string and the new tweak value using the format-preserving encryption object.

11. The method of claim 10, further comprising:

modifying each of the plurality of unique character strings based on the new tweak value.

12. The method of claim 9, wherein the receiving the plurality of unique character strings comprises: receiving, from a server, a predetermined table that defines, for each of the set of characters, a corresponding character string, wherein the predetermined table was generated by generating, for each of the set of n characters, a plurality of non-deterministic random values.

13. The method of claim 9, further comprising:

storing the plurality of unique character strings;
deleting the seed table; and
in response to receiving second tokenization input, re-generating the seed table.

14. The method of claim 9, wherein the outputting the tokenized version of the tokenization input is based on a determination that the tokenization input comprises sensitive data.

15. The method of claim 9, wherein the set of n characters comprises one or more of: numeric characters; alphabetic characters; or symbols.

16. One or more non-transitory computer-readable media storing instructions that, when executed by one or more processors of a computing device, cause the computing device to:
- receive a plurality of unique character strings by receiving, for each character of a set of n characters, a corresponding unique character string that comprises a unique and different permutation of the set of n characters;
- define, based on the plurality of unique character strings, a seed table comprising a plurality of rows and a plurality of columns defining a plurality of cells, wherein:
  - each row of the plurality of rows corresponds to a different character of the set of n characters,
  - each column of the plurality of columns corresponds to a different position within a given unique character string, and
  - each cell comprises a value of the unique character string corresponding to a particular character corresponding to a row at a particular position corresponding to a column;
- generate a tokenization table by expanding the seed table by, for each row of the plurality of rows of the seed table:
  - retrieving a given row of the seed table,
  - generating a shuffle value by determining a deterministically shuffled order of each value of a plurality of cells of the given row,
  - identifying a different row, and
  - determining an output string by, for each individual value of the shuffle value:
    - retrieving a value of the different row at a column index corresponding to the individual value,
    - adding, to the output string, the value, and
    - adding, to the seed table and based on the output string, a new row;
- receive tokenization input; and
- output, based on the tokenization table, a tokenized version of the tokenization input.

17. The one or more non-transitory computer-readable media of claim 16, wherein the instructions, when executed by the one or more processors, cause the computing device to receive the plurality of unique character strings by causing the computing device to:
- receive information indicating:
  - a format-preserving encryption key;
  - a format-preserving encryption tweak value; and
  - a seed value;
- generate a seed hash by hashing the seed value and the format-preserving encryption tweak value;
- generate a first shuffled string comprising a set of n characters by providing, to a random number generator, the seed hash;
- derive a format-preserving encryption key by providing, to a key derivation function, the format-preserving encryption key and the seed value;
- generate, based on the format-preserving encryption key and the format-preserving encryption tweak value, a format-preserving encryption object;
- generate a new tweak value by generating, based on a character set of the set of characters and the format-preserving encryption tweak value, a random string; and
- generate the plurality of unique character strings by generating, for each of the set of characters, a unique string corresponding to a given character by processing the first shuffled string and the new tweak value using the format-preserving encryption object.

18. The one or more non-transitory computer-readable media of claim 17, wherein the instructions, when executed by the one or more processors, further cause the computing device to:
- modify each of the plurality of unique character strings based on the new tweak value.

19. The one or more non-transitory computer-readable media of claim 16, wherein the instructions, when executed by the one or more processors, cause the computing device to receive the plurality of unique character strings by causing the computing device to:
- receive, from a server, a predetermined table that defines, for each of the set of n characters, a corresponding character string, wherein the predetermined table was generated by generating, for each of the set of n characters, a plurality of non-deterministic random values.

20. The one or more non-transitory computer-readable media of claim 16, wherein the instructions, when executed by the one or more processors, cause the computing device to:
- store the plurality of unique character strings;
- delete the tokenization table; and
- in response to receiving second tokenization input, re-generate the tokenization table.

* * * * *